E. C. HICKS.
GEAR SHIFTER.
APPLICATION FILED NOV. 13, 1920.
1,392,159.
Patented Sept. 27, 1921.
2 SHEETS—SHEET 1.
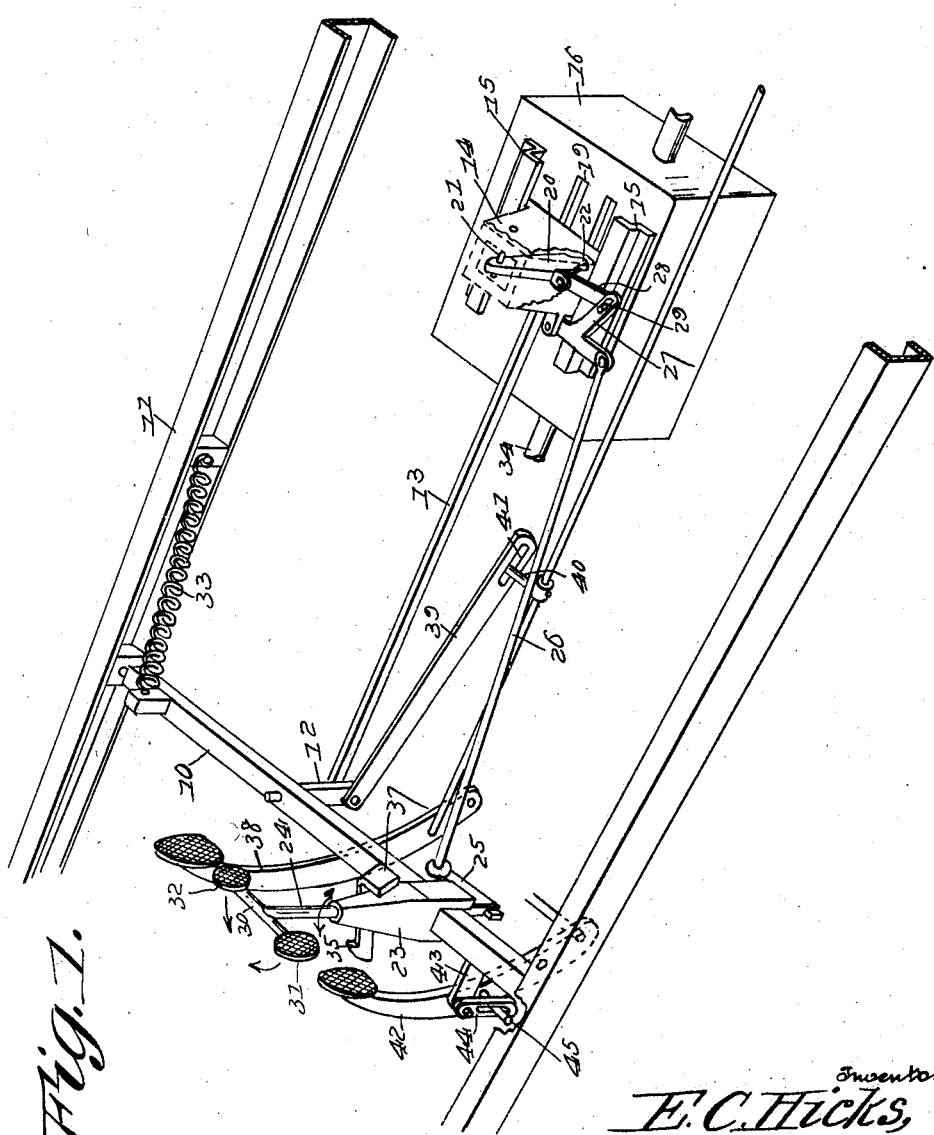

E. C. HICKS.
GEAR SHIFTER.
APPLICATION FILED NOV. 13, 1920.
1,392,159. Patented Sept. 27, 1921.
2 SHEETS—SHEET 2.
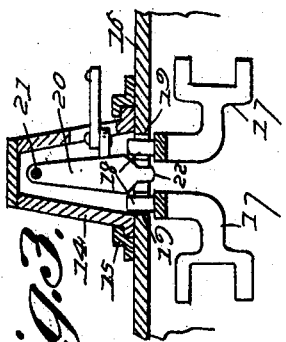
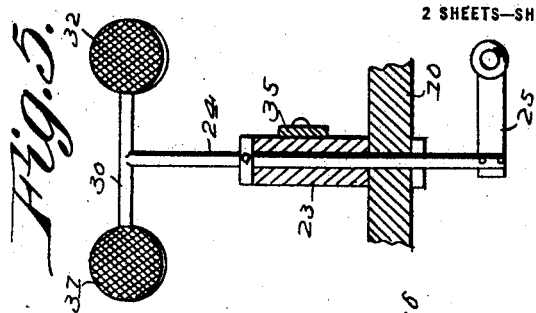
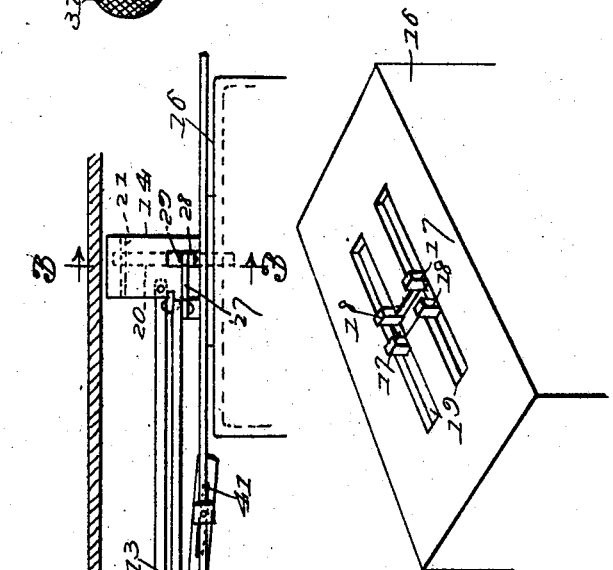
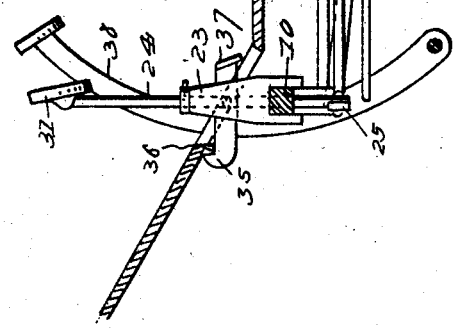

UNITED STATES PATENT OFFICE.

ERNEST C. HICKS, OF WAYNESVILLE, MISSOURI.

GEAR-SHIFTER.

1,392,159. Specification of Letters Patent. Patented Sept. 27, 1921.

Application filed November 13, 1920. Serial No. 423,781.

*To all whom it may concern:*

Be it known that I, ERNEST C. HICKS, a citizen of the United States of America, residing at Waynesville, in the county of Pulaski and State of Missouri, have invented new and useful Improvements in Gear-Shifters, of which the following is a specification.

The object of the invention is to provide a simple and direct means for shifting gears on automobiles and like motor driven vehicles wherein the operation of the gear shifting elements is preferably under the control of foot levers or pedals, and more particularly to provide a mechanism in this connection whereby the adjustment of the elements of the transmission gear for either of three speeds forward and reverse may be effected by the operation of a single foot lever under conditions giving the operator efficient control without interference with the operation of other necessary adjuncts of a complete motor vehicle such as the clutch lever and the brake lever, either or both of which may consist of foot pedals; and with these objects in view the invention consists in a construction and combination of parts of which a preferred embodiment is shown in the accompanying drawings, wherein:—

Figure 1 is a view in perspective of a gear shifting mechanism embodying the invention, portions of the car frame being illustrated to show the relative positioning and mounting of the parts of the same.

Fig. 2 is a side view of the mechanism showing a portion of the car in section.

Fig. 3 is a transverse sectional view through the slide by which is carried the selector for respective engagement with the yokes of the shifting gears.

Fig. 4 is a detail view in perspective of the transmission casing or housing and the arrangement with relation thereto of the clutch elements of the gear shifting yokes.

Fig. 5 is a detail view in elevation and partly in section of the shifting pedal.

In the illustrated embodiment of the invention the essential features are a rocker or rock shaft 10 which may be disposed transversely of the frame of the machine indicated at 11 having an arm 12 connected by a rod or pitman 13 with a slide 14 mounted in suitable guides 15 upon the transmission gear casing or housing 16. The construction of the transmission gear may be of the ordinary or any standard or conventional type where the movement of the shifting gears (not shown) is effected by means of forwardly and rearwardly movable sliding yokes 17 mounted in the gear box or casing and having clutch elements 18 which project through slots 19 in the upper wall of the box.

Mounted in the slide 14 and housed thereby for protection is a preferably pendulous selector member 20 pivoted for example as at 21 and having a clutch element 22 at its free lower end for interchangeable or selective engagement with the clutch elements 18 of the gear shifting yokes 17 to the end that by the engagement of the element 22 with the clutch element of either of the yokes, the yoke thus engaged may be moved either forward or rearward (to correspondingly adjust the shifting gear connected therewith) by the movement of the slide 14 through the agency of the rocker 10. In its normal position the selector 20 occupies a neutral relation between the clutch elements of the gear shifting yokes as shown in Fig. 3.

Mounted upon the rocker 10 is a gear shifting and selecting lever 23 preferably made in the form of a pedal and having a spindle 24 disposed axially in radial relation with the rocker and provided with a crank arm 25 connected by a rod 26 with the selector 20 through suitable intermediate elements such as a bell-crank lever 27 and a link 28, there being a pin and slot connection 29 between said bell-crank lever and the link. Obviously by the turning of the spindle 24 in one direction or the other as indicated by the arrow in Fig. 1, the selector may be swung laterally into engagement with either of the clutch elements of the gear shifting yokes, and to provide for this turning movement of the spindle, the latter is provided with a cross head 30 of which the arms terminally carry pedal plates 31 and 32. Hence by applying foot pressure to one of the pedal plates as for example to the pedal plate 31, the first movement is to turn the spindle 24 and thus communicate motion therefrom through the crank arm 25 and intermediate connections including the rod 26, bell-crank 27 and link 28 to swing the selector 20 into engagement with the clutch element of the right-hand gear shifting yoke 17, while further pressure by the said pedal plate will communicate motion to the rocker 10 in opposition to the retractive tension of a spring 33 connected therewith, to thereby move the slide 14 and shift the gear in the transmission box to a position to effect the drive of the machine at the desired ratio to the speed of the engine shaft 34. Obviously pressure upon the pedal plate 32 will effect an opposite movement of the spindle 24 and thus cause the engagement of the selector with the clutch element of the other gear shifting yoke.

Whereas the movement of the rocker from its neutral position forward to cause a rearward movement of the slide 14 is effected through a continued forward pressure upon one or the other of the pedal plates 31 and 32, in opposition to the tension of the retracting spring 33, it is proposed that the movement of the rocker in the opposite direction from neutral position shall be effected through the tension of the spring 33, and to this end a suitable latch mechanism is employed to normally hold the rocker 10 in its forward position, such means in the construction illustrated consisting of a pivotal latch 35 adapted as indicated in Fig. 2 for engagement with a suitable stop 36 and having at its rear end a heel plate 37 which may be engaged by the heel of the operator to disengage the latch when it is desired that the rock shaft shall be released to permit a forward movement of the slide 14 through the tension of the spring 33. The disengagement of the latch by the heel of foot employed to actuate the shifting lever or pedal may be accomplished at the same time that the toe of the foot is arranged in position to repress either of the pedal plates 31 and 32, to the end that the turning of the spindle 24 thereby will cause the proper adjustment of the selector 20 and hence the movement of the desired gear shifting yoke through the forward movement of the slide 14.

In other words by means of the heel and toe of one foot of the operator it is possible, owing to the construction of the gear shifting pedal, to accomplish the selection of the proper gear shifting yoke and the movement thereof to effect the adjustment of the shifting gear so as to provide for a plurality of forward speeds and reverse, and the return of the pedal to neutral position from either of its adjusted positions may be effected either by removing pressure from the pedal, if it has been advanced under the foot pressure, or by applying pressure thereto if it has been moved to a position in rear of neutral and through the action of the spring 33,—the latch 35 serving to engage and hold the pedal when it reaches neutral position whether moved forwardly or rearwardly toward such position.

The lever 38 shown in the drawings as a foot pedal is designed to represent the brake operating element acting through the rod 39, and in order that the operation thereof may result in the throwing out of the gear, in the event that the movement of the brake lever is prolonged or continued sufficiently to accomplish a full setting of the brake, a connection is established between the rocker and the rod 38 as by means of a link 39 connected with the arm 12 and having a pin and slot connection 40 and 41 with said rod 38.

Also the lever 42 which in the construction illustrated, is shown as a foot pedal, but may if preferred be in the form of a hand lever is designed to serve as a clutch-lever, the connections with the clutch not being illustrated, to the end that the movement thereof may be effected to disengage the clutch through the return of the rock shaft to neutral position the latter may be provided with a crank arm 43 carrying a link 44 having a pin and slot connection 45 and 46 with said lever.

Having described the invention, what is claimed as new and useful is:—

1. A gear shifting mechanism for motor driven vehicles having a pedal actuated rocker, a slide operatively connected with the rocker, a selector movable transversely to the path of the slide for respective engagement with the gear shifting yokes, and a selector actuating spindle movable in opposite directions from a neutral position and axially arranged in radial relation with the rocker, said spindle having a cross arm carrying opposite pedal plates.

2. A gear shifting mechanism for motor driven vehicles having a rocker, a gear shifting slide operatively connected with the rocker, a selector carried by the slide for movement in opposite directions from a neutral position in a direction transverse to the path of the slide for respective engagement with gear shifting yokes, said rocker being movable in either direction from a neutral position, and an operating pedal carried by the rocker and having a radially disposed spindle rotatable in either direction from a neutral position and operatively connected with said selector, said spindle having a cross arm carrying oppositely disposed pedal plates.

3. A gear shifting mechanism for motor driven vehicles having a rocker movable in either direction from a neutral position, and provided with an actuating spring for impelling the same in one direction, a latch mechanism for holding the rocker in neutral position, a gear shifting slide operatively connected with the rocker for movement in opposite directions from a neutral position, a selector carried by the slide for movement in either direction from a neutral position in a path transverse to that of the slide, and a pedal carried by the rocker and having a spindle axially disposed in radial relation with the rocker and connected with said selector, said spindle being movable in either direction from a neutral position and being provided with a cross arm having oppositely disposed pedal plates.

4. A gear shifting mechanism for motor driven vehicles having a rocker movable in either direction from a neutral position, and provided with an actuating spring for impelling the same in one direction, a latch mechanism for holding the rocker in neutral position, a gear shifting slide operatively connected with the rocker for movement in opposite directions from a neutral position, a selector carried by the slide for movement in either direction from a neutral position in a path transverse to that of the slide, and a pedal carried by the rocker and having a spindle axially disposed in radial relation with the rocker and connected with said selector, said spindle being movable in either direction from a neutral position and being provided with a cross arm having oppositely disposed pedal plates, the latch mechanism having a trip element within reach of the heel of a foot applied to one of said pedal plates.

5. A gear shifting mechanism for motor vehicles having a rocker provided with an actuating spring, latch mechanism for normally holding the rocker in a neutral position, a gear shifting slide operatively connected with the rocker, a selector carried by the slide for movement in either direction from a neutral position on a line transverse to the path of movement of the slide, a foot pedal carried by the rocker and having a locking spindle operatively connected with the selector and provided with a cross head for imparting movement thereto in either direction from a neutral position and brake mechanism having an operating lever and provided with a pin and slot connection with the rocker.

6. A gear shifting mechanism for motor vehicles having a rocker provided with an actuating spring, latch mechanism for normally holding the rocker in a neutral position, a gear shifting slide operatively connected with the rocker, a selector carried by the slide for movement in either direction from a neutral position on a line transverse to the path of movement of the slide, a foot pedal carried by the rocker and having a locking spindle operatively connected with the selector and provided with a cross head for imparting movement thereto in either direction from a neutral position and a clutch mechanism having an operating lever and provided with a pin and slot connection with said rocker.

In testimony whereof he affixes his signature.

ERNEST C. HICKS.